(12) United States Patent
Falk

(10) Patent No.: US 8,276,730 B2
(45) Date of Patent: Oct. 2, 2012

(54) CLUTCH

(75) Inventor: Curt Falk, Hudiksvall (SE)

(73) Assignee: Hudiksvalls Teknik Centrum AB, Hudiksvall (SE)

( * ) Notice: Subject to any disclaimer, the term of this patent is extended or adjusted under 35 U.S.C. 154(b) by 534 days.

(21) Appl. No.: 12/521,255

(22) PCT Filed: Dec. 21, 2007

(86) PCT No.: PCT/SE2007/001158
§ 371 (c)(1),
(2), (4) Date: Jun. 25, 2009

(87) PCT Pub. No.: WO2008/079075
PCT Pub. Date: Jul. 3, 2008

(65) Prior Publication Data
US 2010/0089716 A1 Apr. 15, 2010

(30) Foreign Application Priority Data
Dec. 27, 2006 (SE) .................................. 0602818

(51) Int. Cl.
*F16D 25/04* (2006.01)
*F16D 43/21* (2006.01)
*F16D 43/286* (2006.01)
(52) U.S. Cl. .................................. 192/56.3; 192/85.13
(58) Field of Classification Search .............. 192/56.3, 192/85.12, 85.13, 85.63; 403/11, 41
See application file for complete search history.

(56) References Cited

U.S. PATENT DOCUMENTS

| 2,277,554 | A | * | 3/1942 | McCoy | 192/56.3 |
| 4,264,229 | A | | 4/1981 | Falk et al. | |
| 4,552,257 | A | * | 11/1985 | Witt | 192/56.3 |
| 4,635,769 | A | * | 1/1987 | de Hertel Eastcott | 477/178 |
| 4,923,320 | A | * | 5/1990 | Klischat | 403/5 |
| 4,944,377 | A | * | 7/1990 | Elsner | 192/56.3 |
| 6,908,393 | B1 | * | 6/2005 | Falk | 464/10 |

FOREIGN PATENT DOCUMENTS

| DE | 101 39 576 A1 | 3/2003 |
| WO | WO 01/75321 A1 | 10/2001 |
| WO | WO 02/073055 A1 | 9/2002 |

* cited by examiner

*Primary Examiner* — David D Le
*Assistant Examiner* — Terry Chau
(74) *Attorney, Agent, or Firm* — Dickstein Shapiro LLP

(57) ABSTRACT

A clutch of hydraulic-pressure type comprising a linearly controlled piston (300) that is movable in a channel in the clutch and that carries a pivotally mounted support leg (208) that is spring biased into axial alignment with the piston, the side of which facing away from the support leg is loaded by the hydraulic pressure. The clutch is annular and co-operates with a shaft shank (1), and the free end of the support leg rests against a support surface carried by the shaft shank (1) upon rotation between the shaft shank (1) and the clutch (4), the support leg is turned away, whereby the piston (300) is displaced and opens a valve through which the hydraulic pressure is evacuated.

4 Claims, 2 Drawing Sheets

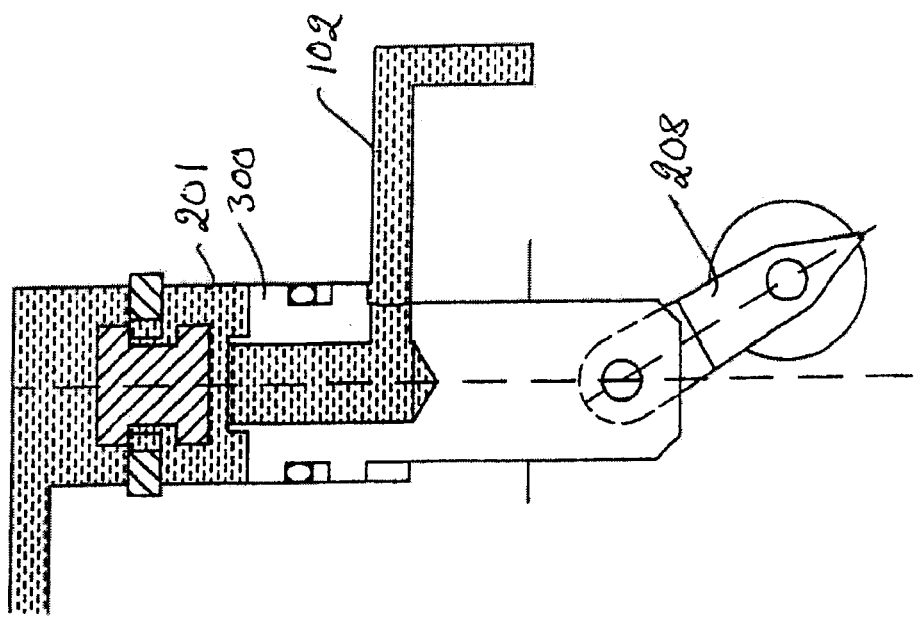
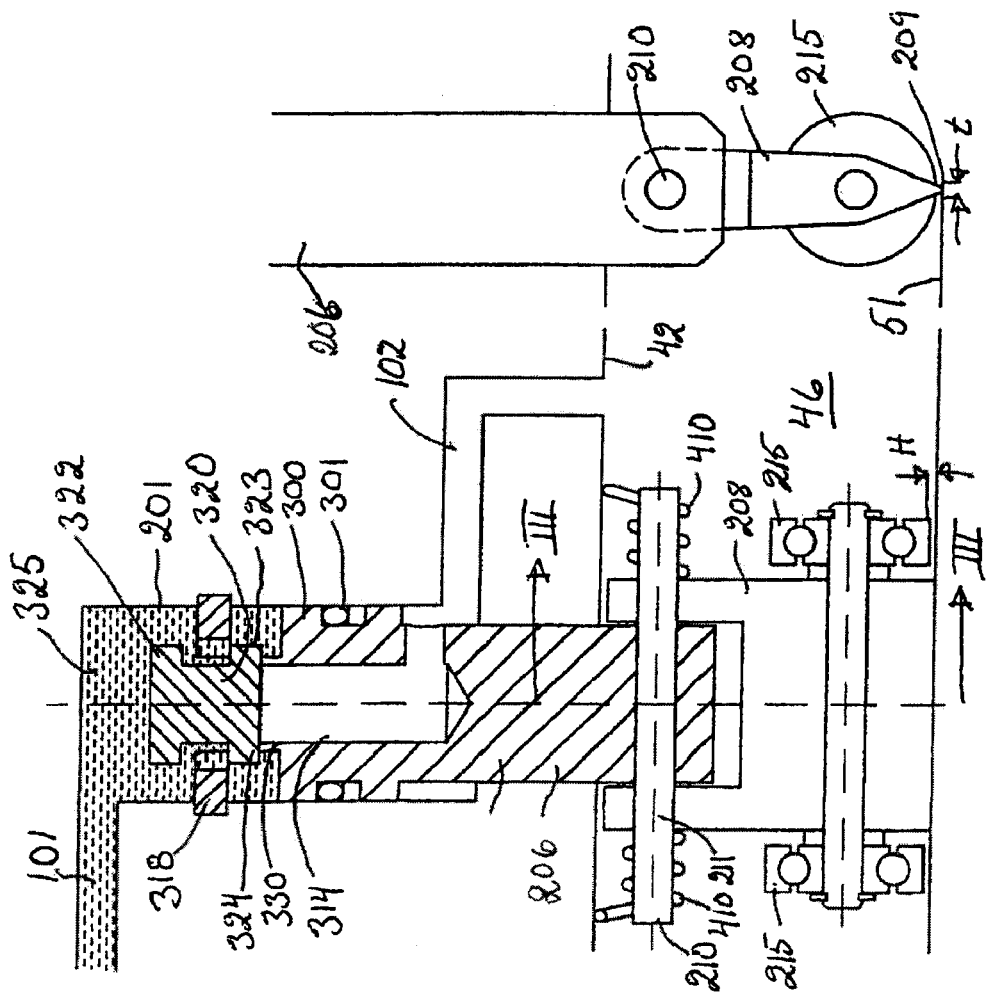

CLUTCH

The invention relates to a clutch of the kind that is defined in the preamble of claim 1.

Accordingly, the clutch is of the kind that comprises a housing having at least one thin-walled sleeve that forms an axially extended limiting wall of an annular chamber, the chamber being arranged to be supplied with a pressurizing medium for a substantially elastic deformation of the sleeve, so that a surface of the sleeve is pushed in radial direction into immediate home contact with a smooth, complementary shaped surface of an element that should be drivingly connected to the clutch, the chamber having a channel arrangement that is connected thereto and arranged to co-operate with a disengaging device that is activatable by relative motion between said surfaces, into a state in which pressure medium can flow through the channel arrangement from the chamber, whereby the chamber is relieved from the pressure acting therein, whereby the element can rotate independently of the clutch. Such a clutch is previously known from, for instance, U.S. Pat. No. 4,264,229 and has the advantage of being able to transmit relatively great powers, by being able to establish a high contact pressure via the wall, so that the clutch can be given relatively small dimensions, in spite of high transmitted powers.

A drawback with such a known clutch is that it is complicated and time-consuming to reset the disengaging member into the engaged state, and furthermore, then it is usually required that the element and the clutch are held in a predetermined relative position.

Therefore, the previously known clutches cannot, or only with difficulty, be operated in a remote-controlled way, i.e., at a greater distance from the disengaging member.

Therefore, one object of the invention is to obviate the indicated drawbacks entirely or partly and to provide a clutch that should be engagable when standing still or at a synchronous rotational speed between the element and the clutch.

A further object of the invention is to provide a disengaging device, which at occurring relative rotation between the element and the clutch has an utmost fast reaction time, so that the friction surfaces utmost fast clear each other so that the risk of damage is avoided. By forming the decoupling device so that the same can be re-established in an arbitrary rotary position between the element and the clutch, a simple device is facilitated and made possible in order to, in a remote-controlled way, be able to reset the disengaging device into the engaged state and to pressurize the chamber so that the clutch again can transmit driving power.

The objects are entirely or partly attained by the invention.

The invention is defined in the appended independent claim.

Embodiments of the invention are defined in the appended dependent claims.

In the following, the invention will be described by way of examples, reference being made to the appended drawing.

FIG. 2 shows an enlarged depiction of the detail II in FIG. 1.

FIG. 3 shows a schematic, sectioned view taken along the line III-III in FIG. 2.

FIG. 4 shows a generalized simple embodiment of the motion sensor (105) and the valve (104) according to FIG. 1.

Figure 1:
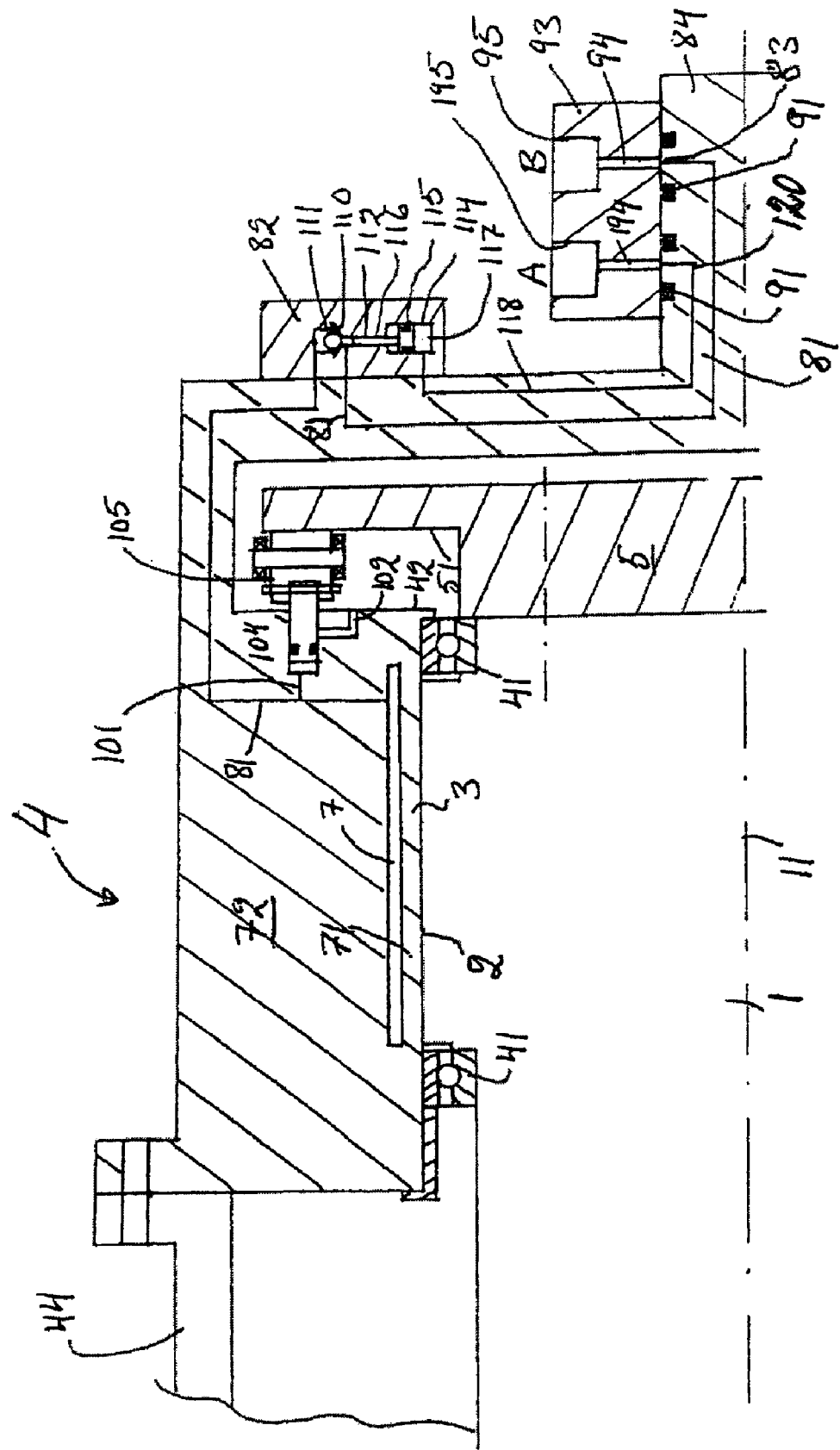
FIG. 1 shows an axial section through a clutch according to the invention.

In FIG. 1, there is shown a shaft shank (1) having a circular-cylindrical surface (2), which is adjacent to a surrounding circular-cylindrical inner surface (3) of a clutch (4), which is shown rotary mounted on the shaft shank (1) by means of ball bearings (41). To the end of the shank (1), there is an annular disc (5) fitted, which has a surface (51) lying in the normal plane of the axis (11) of the shank (1) and is facing and situated at a distance from the surface (42) of the clutch (4). In the clutch (4), there is a cylindrical chamber (7) that extends along the contact surface (2) of the shaft shank (1) and is separated from the inner surface (3) of the clutch (4) by an elastic, comparatively thin wall (71). The main part (72) of the clutch (4) outside the chamber (7) is essentially stiff and is shown coupled to an output tubular shaft (44).

The chamber (7) can be filled with pressurized hydraulic fluid via a first channel (81), which mouths in a circumferential groove (83) in a shaft journal (84) that is coaxial with the shank (1) and carried by the clutch (4). The annular groove (83) is surrounded by a pair of shaft seals (91) that afford sealing against a sleeve (93) that is coaxial to the journal (84) and has a radial channel (94) to a connection coupling (95) that allows connection to a pressurized hydraulic-liquid source (B) (not shown in detail).

Furthermore, there is shown a branch channel (101, 102) that is branched off from the channel (81) and allows conveying away of hydraulic fluid from the chamber (7). Between the channel parts (101, 102), there is a valve 104 that is controlled by a sensor 105 when the same detects relative rotation between the clutch (4) and the shaft shank (1), whereby the valve (104) opens so that hydraulic fluid is released from the chamber (7), whereby the abutment of the wall (71) against the surface (2) of the shank substantially is eliminated so that no significant power can be transmitted between them.

Such as will be indicated in more detail herein, after disengagement of the clutch, the sensor device (105) is arranged to aim to return the valve (104) toward the closed position, so that the chamber (7) again can be pressurized with pressurized fluid via the channel (94) after the valve (82) has been opened.

In FIG. 1, it can be seen that the non-return valve (82), as an example, comprises a conical seat (110), which receives a ball (111) that is spring-loaded thereto and thereby blocks a channel (112) coaxially connected to the conical surface (110) and from which the conduit branch (81) between the non-return valve (82) and the connection (95) is branched off. The channel (112) connects to a circular-cylindrical chamber (114), which contains a piston (115) having a shank (116) that extends into the channel (112) and lifts up the ball (111) from the seat (110) when the piston (115) is displaced to the adjacent end of the chamber (114). The opposite end (117) of the chamber (114) is connected to a fluid channel (118) that mouths in a circumferential groove (120) in the shaft journal (84), the groove being surrounded by a pair of shaft seals (91) that seal against the inner circumferential surface of the sleeve (93) and prevent axial propagation of liquid from the groove (120) axially along the surface of the shaft journal (84). In the sleeve (93), there is a radial bore (194) that connects to a coupling (195), which can be connected to a pressurized fluid source (A) (not shown in detail) for the opening of the non-return valve (82). The pressure sources (A, B) can easily be connected to the connections (195, 95), since the sleeve (93) can stand still while the journal (84) (the clutch (4)) rotates.

In FIG. 2, it can be seen that the channel part (101) contains a cylinder chamber (201) that displaceably receives a piston (300), which by means of a circumferential seal (301) seals against the wall (201) and which is displaceable along the cylinder. The piston (300) has a shank 206 that extends through a guide channel 102, which extends from the bottom of the cylinder (201) and out through the end surface (42) of the clutch housing into a space (46). The shank (206) carries a support leg (208) via a pivot mounting (210) that is formed of a shaft shank (211) that extends through aligned bores in the shank 206 and the support leg (208). The axis of the mounting (210) is perpendicular to the displacement direction of the piston (300) and extends generally radially and parallel to the surface (51). The free end (209) of the support leg has a small width (t) in the circumferential direction of the shaft shank and rests surface-extendedly against the support surface (51) when the support surface (209) lies centered against the axis of the pivot mounting (210) in a direction parallel to the displacement direction of the piston (300) in the cylinder (201).

The support leg (209) is shown to be provided with a pair of rollers (215) that have the periphery thereof at a small distance (H) from the support surface (51) when the leg (208) stably rests with the free end surface (209) thereof on the surface (51).

The rollers (215) allow the leg (208) to turn away particularly fast along a preselected fold-out angle of the support leg from the initial support direction thereof. Then, the roller relieves the support leg, and holds the support leg raised from the support surface (51) so that the support leg cannot damage the support surface even during continued sustained rotation between the clutch and the shaft shank. The rollers are mounted for rotation, or formed of rolling bearings. The rollers (215) are mounted on the support leg so as to have the same projection on both sides of the leg so that it contacts the support at substantially the same fold-out angle of the leg in the two fold-out directions thereof.

In FIG. 2, it can be seen that the channel part (102) mouths in the space (46) and has the end thereof connected to a bottom part of the cylinder (201) under the piston (300), and that furthermore, the piston (300) has a throughput channel (314) that extends from a central area of the upper end of the piston (300), and out through a side opening of the shank (305) under the proper piston part (300). Furthermore, it can be seen that the cylinder (201) contains a fixed annular disc (318) that with play receives a shank part (320) connecting two end pieces (322, 323), which retain the element (325), formed of the end pieces (322, 323) and the shank (320), at the annular disc (318). The lower element (323) has a lower smooth sealing surface (324) that is perpendicular to the displacement direction of the piston (300) and can seal against the adjacent edge of an annular seat (330), which seat surrounds the upper end of the channel (314) when the piston (300) is in an upper end position corresponding to the piston being carried on the support surface (51) via the shank and the leg (208). Furthermore, in FIG. 2, it can be seen that springs (410) are arranged to bias the leg (208) toward the orientation thereof, in which the support leg (208) stably rests on the surface (51) via the support surface (209) thereof, i.e., the state shown in FIG. 3.

When a rotary motion occurs between the element and the clutch, the leg (208) will turn around the mounting (210), and in a very short pivotal motion, the rollers (215) contact the support surface, so that the leg (208) is turned away very fast, since the high fluid pressure in the chamber (7) acts against the upper side of the piston (300) and drives the piston downward in FIG. 2, whereby the pivot motion of the leg (208) is accelerated after the initial turning out of the leg (208) from the support position. The element (325) is prevented from running along in the displacement motion of the piston (300), which means that the sealing surface (324) raises from the seat (330), so that the pressurized hydraulic fluid can pass through the gap between the shank (320) and the annular disc (318) and into the channel (314) and further out into the bottom area of the cylinder chamber (201) and further through the channel part (102) out into the space (46), whereby the hydraulic pressure in the chamber (7) very quickly drops and the clutch is disengaged.

When the pressure in the chamber (7) has been relieved and the surfaces (51) and (42) do not experience any relative rotary motion, the springs (310) can turn the support leg (208) toward the supporting position thereof, the shank 206 and the piston (300) being raised so that the seal between the seat (330) and the surface (324) being reestablished.

By opening the non-return valve (82), a fast disengagement of the clutch (4) is attained, the valve device (104) preventing fluid from escaping through the channel (101, 102).

In FIG. 4, there is illustrated a generalized variant of the valve device (105) (FIG. 1), wherein the proper piston (300) by the displacement thereof affords a communication between the cylinder (201) and the channel part (102).

It will be appreciated that the clutch according to the invention can be reset easily after disengagement, since the spring (410) can turn the support leg (208) toward the supporting position thereof, the force of the spring housing (410) being sufficient to produce a displacement of the piston (300) in the upward direction in FIG. 2, since the fluid pressure in the channel system and the chamber (7) is low, after a release of the valve function by which fluid is discharged through the conduit (101,102). Upon the return of the support leg (208) into the supporting position by means of the spring (310), simultaneously the valve device is reset into the closed position. Since the support leg is formed to be pivotable in either direction, the release function is independent of the direction of rotation of the clutch in relation to the shaft shank. The valve function illustrated in FIG. 2 affords particularly fast emptying of the channel system, and the rollers (215) afford the support leg (208) a particularly fast folding motion into a fold-out position, wherein the valve device opens the fluid-emptying conduit (101, 102).

Furthermore, a disengagement independent of the valve device can be produced in a simple way and also in a remote-controlled way by the fluid-operated actuator (114-117) for the non-return valve (82). By the structure with a rotatable swivel block (93) for the pressure-fluid connections (a, b), a remote control of the clutch also in respect of engagement is allowed.

The invention claimed is:

1. A clutch comprising a housing having at least one thin-walled sleeve (71) that forms an axially extended wall of an annular chamber (7) having a small radial thickness, the chamber (7) being arranged to be supplied with a pressurized fluid for substantially elastic deformation of the sleeve so that a surface (3) of the sleeve engages a smooth complementary shaped surface (2) of a shaft shank (1) to be drivingly connected to the clutch (4), the chamber (7) being connected to a channel system (81), which is arranged to co-operate with members (104, 105) for disengagement of the clutch, said members being arranged to be activated upon a relative motion between the shaft shank (1) and the clutch (4) into a state in which the pressurized fluid can flow through the channel system away from the chamber (7), in order to allow the shaft shank (1) to rotate independently of the clutch, said members comprising a branch conduit that is connected to the channel system and has a valve device, which is arranged to allow emptying of fluid from the channel system, and a piston that is movable along a branch-conduit section connected to the channel system, the piston being arranged to, in a first displacement end position, prevent the valve device from conveying away fluid from the channel system, and, in a second displacement position, readjust the valve device for conveying away fluid from the channel system, and a support device (208) that is carried by the piston and, upon relative motion between the clutch (4) and the shaft shank (1), arranged to allow the piston (300) to be displaced to the second position thereof, characterized in that the support device comprises a support leg (208) that, by means of a pivot mounting (210), is pivotably connected to the piston (300, 206), that the support leg (208), at a free end thereof, has a support surface (209) that affords the support leg a limited pivotal stabilization by surface contact with the second support surface (51) perpendicular to the displacement direction of the piston and rotationally symmetrical around an axis (11) of the shaft shank, the second support surface (51) being formed on an annular disc fixedly connected to the shaft shank (1), that the support leg (208) is biased toward the supporting pivotal position thereof by a spring device (410), wherein a line, which is parallel to the displacement direction of the piston (300) and extends through the axis of the pivot mounting (210), extends centrally through the support surface (209) of the support leg (208), and that the piston is in the first displacement end position thereof when the support leg is in the supporting pivotal position thereof and rests against the second support surface.

2. The clutch according to claim 1, characterized in that the channel system contains a filling conduit (81) for pressurized fluid, and a non-return valve 82 inserted into the conduit, and that the clutch contains a feed conduit (118) for hydraulic feeding of a hydraulic actuator (114-116) for transferring the non-return valve (82) into the opened position, for disengagement of the clutch.

3. The clutch according to claim 1, characterized in that the leg (208) carries a rotary mounted roller (215), the rotation axis of which is parallel to the pivot-mounting axis of the leg, and that the periphery of the roller is at small distance from the support surface of the support leg in order to rest against the second support surface at a preselected fold-out angle of the support leg from the initial support-position orientation thereof, and at an increased fold-out angle carry the support leg at a distance from the second support surface (51).

4. The clutch according to claim 3, characterized in that the support roller (215) is placed to contact the second support surface (51) at the same fold-out angle of the support leg (215) in the two fold-out directions of the support leg (215).

* * * * *